(12) United States Patent
Valpola (10) Patent No.: US 11,568,208 B2
(45) Date of Patent: *Jan. 31, 2023

(54) SOLUTION FOR MACHINE LEARNING SYSTEM

(71) Applicant: CANARY CAPITAL LLC, Wilmington, DE (US)

(72) Inventor: Harri Valpola, Helsinki (FI)

(73) Assignee: Canary Capital LLC, Wilmington, DE (US)

(*) Notice: Subject to any disclaimer, the term of this patent is extended or adjusted under 35 U.S.C. 154(b) by 649 days.

This patent is subject to a terminal disclaimer.

(21) Appl. No.: 16/677,851

(22) Filed: Nov. 8, 2019

(65) Prior Publication Data

US 2020/0151547 A1 May 14, 2020

(30) Foreign Application Priority Data

Nov. 9, 2018 (FI) ...................................... 20185958

(51) Int. Cl.
*G06N 3/04* (2006.01)
*G06N 20/00* (2019.01)
(Continued)

(52) U.S. Cl.
CPC .............. *G06N 3/0454* (2013.01); *G06N 3/08* (2013.01); *G06N 3/10* (2013.01); *G06N 20/00* (2019.01)

(58) Field of Classification Search
CPC ........ G06N 3/0454; G06N 20/00; G06N 3/08; G06N 3/10
See application file for complete search history.

(56) References Cited

U.S. PATENT DOCUMENTS 10,733,510 B2 8/2020 Nageshrao et al.
2003/0014692 A1 1/2003 James et al.
(Continued)

FOREIGN PATENT DOCUMENTS

| EP | 3343456 A1 | 7/2018 |
| JP | 2020030686 A | 2/2020 |
| WO | 2017/105866 A1 | 6/2017 |

OTHER PUBLICATIONS

Gurevich, Pavel, and Hannes Stuke. "Pairing an arbitrary regressor with an artificial neural network estimating aleatoric uncertainty." arXiv preprint arXiv:1707.07287 (2017). (Year: 2017).*

(Continued)

*Primary Examiner* — Eric Nilsson
(74) *Attorney, Agent, or Firm* — Young Basile Hanlon & MacFarlane, P.C.

(57) ABSTRACT

Disclosed is a computer-implemented method for estimating an uncertainty of a prediction generated by a machine learning system, the method including: receiving first data; training a first machine learning model component of a machine learning system with the received first data, the first machine learning model component is trained to generate a prediction; generating an uncertainty estimate of the prediction; training a second machine learning model component of the machine learning system with second data, the second machine learning model component is trained to generate a calibrated uncertainty estimate of the prediction. Also disclosed is a corresponding system.

21 Claims, 3 Drawing Sheets

(51) Int. Cl.
*G06N 3/10* (2006.01)
*G06N 3/08* (2006.01)

(56) References Cited

U.S. PATENT DOCUMENTS

| | | | |
|---|---|---|---|
| 2004/0133533 | A1 | 7/2004 | Keeler et al. |
| 2005/0160340 | A1 | 7/2005 | Abe et al. |
| 2007/0288414 | A1 | 12/2007 | Barajas et al. |
| 2014/0358831 | A1 | 12/2014 | Adams et al. |
| 2014/0365409 | A1 | 12/2014 | Burch et al. |
| 2016/0018835 | A1 | 1/2016 | Gaasch et al. |
| 2016/0104070 | A1 | 4/2016 | Eslami et al. |
| 2017/0176956 | A1 | 6/2017 | Fusi et al. |
| 2017/0220928 | A1* | 8/2017 | Hajizadeh .......... G06Q 10/0637 |
| 2018/0204116 | A1 | 7/2018 | Evans et al. |
| 2018/0232557 | A1 | 8/2018 | Chang et al. |
| 2018/0341876 | A1* | 11/2018 | Ghosh .................. G06N 3/0454 |
| 2019/0369503 | A1 | 12/2019 | Ypma et al. |
| 2020/0004259 | A1 | 1/2020 | Gulino et al. |
| 2020/0125225 | A1 | 4/2020 | Bettles et al. |

OTHER PUBLICATIONS

An, Jinwon, and Sungzoon Cho. "Variational autoencoder based anomaly detection using reconstruction probability." Special Lecture on IE 2.1 (2015): 1-18. (Year: 2015).*

Hendrycks, Dan, and Thomas G. Dietterich. "Benchmarking neural network robustness to common corruptions and surface variations." arXiv preprint arXiv:1807.01697 (2018). (Year: 2018).*

Finnish Search Report, dated Jun. 6, 2019, from corresponding/related Finnish Application No. 20185958.

International Search Report, dated Feb. 11, 2020 issued in International Patent Application No. PCT/EP2019/079974.

Gurevich, P. and Stuke, H., "Pairing an arbitrary regressor with an artificial neural network estimating aleatoric uncertainty," arxiv.org, Cornell University Library, Sep. 3, 2018.

Rodrigues, F. et al., "Beyond expectation: Deep joint mean and quantile regression for spatio-temporal problems," arxiv.org, Cornell University Library, Aug. 27, 2018.

Seo, S. et al., "Confidence Calibration in Deep Neural Networks through Stochastic Inferences," Oct. 1, 2018, retrieved from the Internet: URL:https://arxiv.org/abs/1809.10877v2.

Zhu, L. and Laptev, N., "Deep and Confident Prediction for Time Series at Uber," 2017 IEEE International Conference on Data Mining Workshops (ICDMW), Nov. 18, 2017.

International Search Report issued in International Application No. PCT/EP2019/079967 dated Feb. 13, 2020.

Devries, T. et al., "Leveraging Uncertainty Estimates for Preceding Segmentation Quality," Jul. 2, 2018, retrieved from the Internet: URL:hllps://arxiv.org/pdf/1807.00502.pdf.

Gal, Y. et al., "Dropout as Bayesian Approximation: Representing Model Uncertainty in Deep Learning," Oct. 4, 2016, retrieved from the Internet: URL:https://arxiv.org/pdf/1506.02142.pdf.

Le, M. et al., "Uncertainty Estimation for Deep Neural Object Detectors in Safety-Critical Applications," 2018 21st International Conference on Intelligent Transportation Systems (ITSC), Nov. 4-7, 2018.

FI Search Report, dated Jun. 6, 2019, from corresponding FI Application No. 20185956.

* cited by examiner

SOLUTION FOR MACHINE LEARNING SYSTEM

TECHNICAL FIELD

The invention concerns in general a technical field of machine learning systems. More particularly, the invention concerns a solution for determining uncertainty relating to a machine learning system.

BACKGROUND

Machine learning methods and lately especially neural networks and so-called "deep learning" methods are utilized widely in modern technology, for example in machine vision, pattern recognition, robotics, control systems and automation. In such applications machine learning is used in computer-implemented parts of a system or a device for processing input data.

Machine learning methods, for example based on artificial neural networks, can be used to generate, i.e. to construct, models based on input and output data. Such models may be e.g. classification, prediction or regression models, where after training the system with training data consisting corresponding inputs and outputs, the trained model may then be used to generate a "predicted" output corresponding to a provided new input. The generated output, e.g. a classification result, or any kind of other model output, can then be called the "prediction" and the model a "prediction model".

However, even though this methodology can be used to generate a model of a system, the models constructed in this way are often unsuitable for many applications, e.g. prediction or control applications. This is because the models, being automatically generated, are very complex and internally noisy, nonlinear mappings from input signals to output signals, and are not guaranteed to produce sensible outputs with all inputs. Thus it is uncertain if the model predictions are correct, or what are the confidence intervals of the predictions. Input data may also have inherent stochasticity, training data of the model can be limited so that the model is working outside the area where it is valid.

There is thus uncertainty in the outputs of a model. This uncertainty can be categorized into two types:
Type 1 ("aleatoric"): Uncertainty that has been observed in the training data, e.g. random noise in the input data.
Type 2 ("epistemic"): Uncertainty that has not been observed in the training data; e.g. an input data with no similar examples in the training data.

In case of a Type 1 uncertainty, the uncertainty in the prediction results from stochasticity inherent in the training data.

In case of a Type 2 uncertainty, the uncertainty generally cannot be estimated using statistical methods, as the problem is not stochasticity in the input data, but the internal modeling shortcomings in the model. Estimating this component of uncertainty of the outputs would require the model to detect unfamiliar data points, and to reflect that in the estimation of the prediction uncertainty.

Traditionally, data-driven methods (such as neural networks) tend to underestimate uncertainty for previously unseen data, meaning that they 'overfit' to seen data but lack extrapolative power that e.g. first principles models (e.g. those based on laws of physics, chemistry etc.) or some empirical models may have. While such first principles models are usually robust, even they may produce unreliable outputs when assumptions they were constructed with don't hold (e.g. errors in input data caused by a broken sensor, or an exceptional process operating point of a process producing the input data).

In order to use neural network models for prediction, classification and controlling tasks it is important to be able to estimate the uncertainty related to the model outputs, so that validity and reliability of the results and decisions based on the results can be predicted. Thus, there is need to develop mechanisms by means of which it is possible at least in part to improve determining the uncertainty of a prediction generated with a machine learning system.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a computer implemented method, a system and a computer program product for estimating an uncertainty of a prediction generated by a machine learning system.

The objectives of the invention are reached by a computer implemented method, a system and a computer program product as defined by the respective independent claims.

According to a first aspect, a computer-implemented method for estimating an uncertainty of a prediction generated by a machine learning system is provided, the method comprising: receiving first data; training a first machine learning model component of a machine learning system with the received first data, the first machine learning model component is trained to generate a prediction; generating an uncertainty estimate of the prediction; training a second machine learning model component of the machine learning system with second data, the second machine learning model component is trained to generate a calibrated uncertainty estimate of the prediction.

The uncertainty estimate of the prediction may be generated by one of the following: the first machine learning model component, the second machine learning model component, an external machine learning model component.

The second machine learning model component of the machine learning system may be trained to generate the calibrated uncertainty estimate of the prediction in response to a receipt, as an input to the second machine learning component, the following: the prediction; the uncertainty estimate of the prediction; and an output of at least one anomaly detector. Moreover, the anomaly detector may be trained with the received second data for detecting deviation in the operational data.

The first machine learning model component may be one of the following: a denoising neural network, a generative adversarial network, a variational autoencoder, a ladder network, a recurrent neural network.

On the other hand, the second machine learning model component may be one of the following: a denoising neural network, a generative adversarial network, a variational autoencoder, a ladder network, a recurrent neural network.

The second data may be one of the following: the first data, out-of-distribution data. For example, the out-of-distribution data may be generated by corrupting the first machine learning model component parameters and generating the out-of-distribution data by evaluating the corrupted first machine learning model component.

According to a second aspect, a control system for estimating an uncertainty of a prediction generated by a machine learning system is provided, the control system is arranged to: receive first data; train a first machine learning model component of a machine learning system with the received first data, the first machine learning model component is trained to generate a prediction; generate an uncertainty estimate of the prediction; train a second machine learning model component of the machine learning system with second data, the second machine learning model component is trained to generate a calibrated uncertainty estimate of the prediction.

The system may be arranged to generate the uncertainty estimate of the prediction by one of the following: the first machine learning model component, the second machine learning model component, an external machine learning model component.

The system may be arranged to train the second machine learning model component of the machine learning system to generate the calibrated uncertainty estimate of the prediction in response to a receipt, as an input to the second machine learning component, the following: the prediction; the uncertainty estimate of the prediction; and an output of at least one anomaly detector. Moreover, the system may be arranged to train the anomaly detector with the received second data for detecting deviation in the operational data.

The first machine learning model component may be one of the following: a denoising neural network, a generative adversarial network, a variational autoencoder, a ladder network, a recurrent neural network.

On the other hand, the second machine learning model component may be one of the following: a de-noising neural network, a generative adversarial network, a variational autoencoder, a ladder network, a recurrent neural network.

According to a third aspect, a computer program product is provided, the computer program product comprising at least one computer-readable media having computer-executable program code instructions stored therein for performing the method as described above when the computer program product is executed on a computer.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIG. 1 illustrates schematically a system by means of which the invention may be implemented to.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

In order to describe at least some aspects of the present invention according to at least one embodiment it is hereby assumed that a machine learning system comprising a number of machine learning model components is implemented, which machine learning system is trained to perform its task. The training may be performed by inputting data also called as training data, e.g. being relevant to the task. In order to estimate an operation of the machine learning system a method according to an embodiment of the invention is developed.

Figure 1:
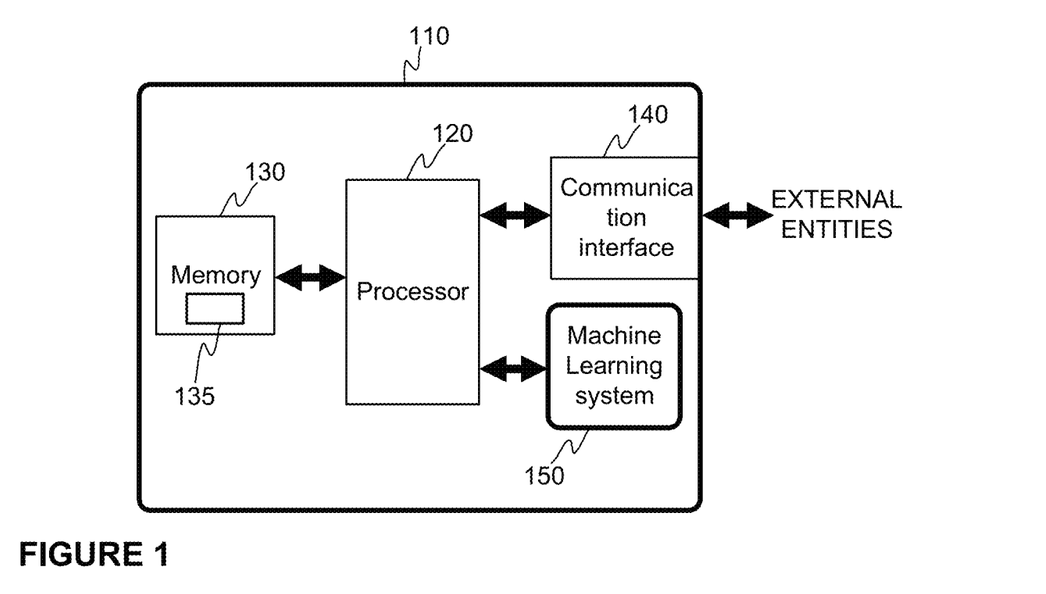

A non-limiting example of a system 110 suitable for performing an estimation of an uncertainty of a prediction of a machine learning system according to an embodiment of the invention is schematically illustrated in FIG. 1. The system 110 may comprise a processing unit 120, which may be implemented with one or more processors, or similar. The system 110 may also comprise one or more memories 130 and one or more communication interfaces 140. The one or more memories 140 may be configured to store computer program code 135 and any other data, which, when executed by the processing unit 120, cause the system to operate in the manner as described. The mentioned entities may be communicatively coupled to each other e.g. with a data bus. The communication interface 140, in turn, comprises necessary hardware and software for providing an interface for external entities for transmitting signals to and from the system 110. In the exemplifying implementation of the system 110 the system 110 comprises a machine learning system 150 comprising a number of machine learning model components by means of which the estimation on an uncertainty of a prediction as described may be generated. In the example of FIG. 1 the machine learning system 150 is arranged to operate under control of the processing unit 120. In some other embodiment of the present invention the machine learning system 150, at least in part, may reside in another entity than the system 110. Furthermore, in some other embodiment the processing unit 120 may be configured to implement the functionality of the machine learning system and there is not necessarily arranged a separate entity as the machine learning system 150.

Figure 2:
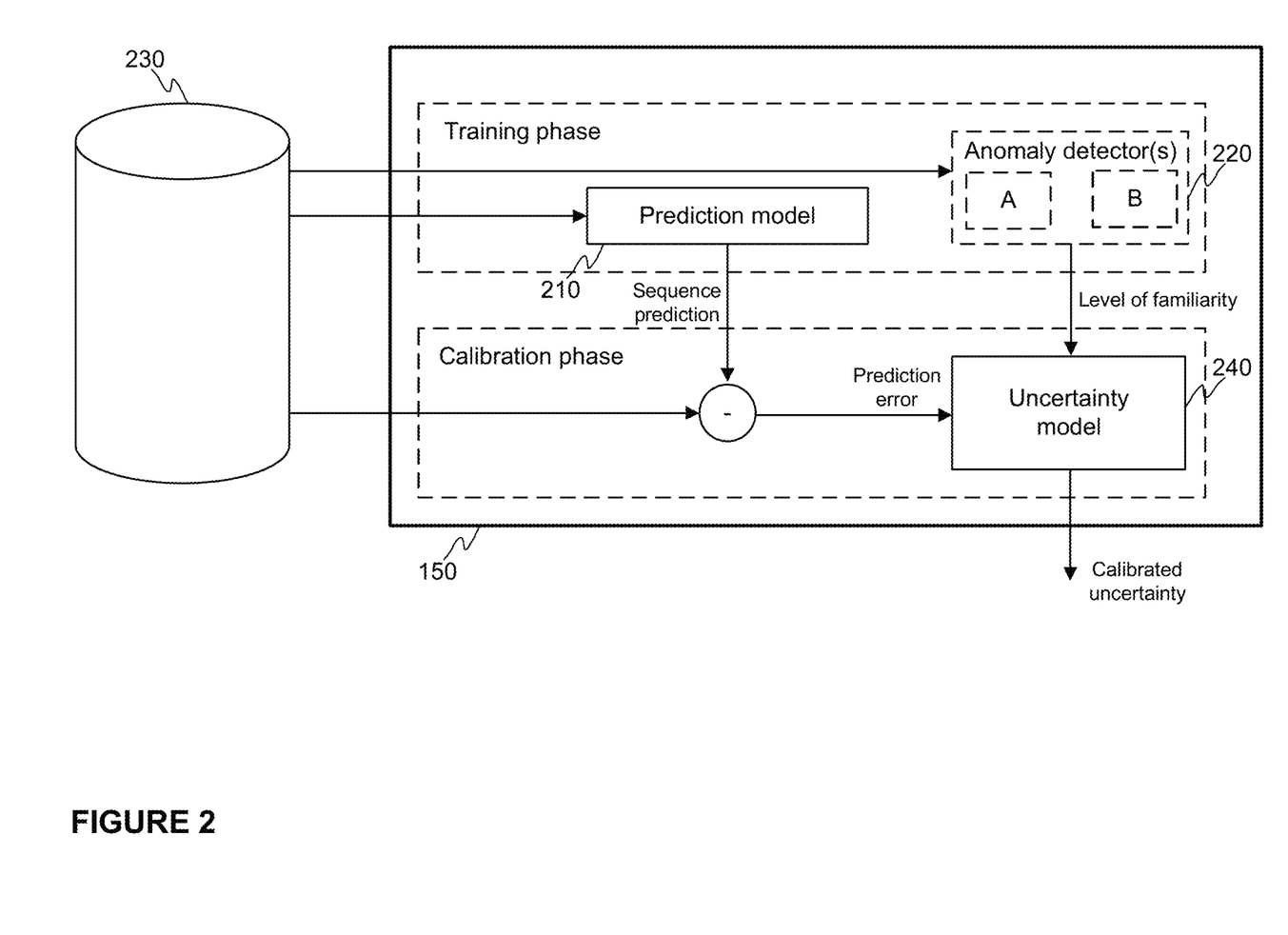
FIG. 2 illustrates schematically a machine learning system according to an embodiment of the invention.

As mentioned, the machine learning system 150 may comprise a number of machine learning model components. An example of the machine learning system 150 according to an embodiment of the invention is schematically illustrated in FIG. 2. The machine learning system 150 according to the embodiment of the present invention may comprise a first machine learning model component 210 which may be trained at least to generate a prediction on a state of a target system 110, but possibly also an uncertainty estimate on the prediction. In some other embodiment the uncertainty estimate on the prediction may be generated by another machine learning model component external to the first machine learning model component 210. The uncertainty estimate on the prediction may be scaled for the need. Some non-limiting examples of applicable neural network models for the first machine learning model component 210 may be: a denoising neural network, a generative adversarial network, a variational autoencoder, a ladder network, a recurrent neural network. Examples of applicable recurrent neural networks may e.g. be LSTM, GRU and other such networks. Moreover, the machine learning system 150 may comprise a second machine learning model component 240 which may be trained to generate a calibrated uncertainty estimate of the prediction. Some non-limiting examples of applicable neural network models for the second machine learning model component 240 may be: a denoising neural network, a generative adversarial network, a variational autoencoder, a ladder network, a recurrent neural network. Examples of applicable recurrent neural networks may e.g. be LSTM, GRU and other such networks. As a non-limiting example, the second machine learning model component 240 may be arranged to generate the uncertainty estimate on the prediction among other tasks. In addition to the mentioned elements the machine learning system 150 may comprise at least one anomaly detector 220 for detecting anomalous states of the target system as will be described. The anomaly detector 220 may be included in the solution by generating an anomaly detector output, i.e. comprising input of data to the anomaly detector, triggering computations in the anomaly detector implementation, and receiving anomaly detector results as output. The anomaly detector may be implemented as a machine learning based component, e.g. a neural network model, in which case the evaluation of the anomaly detector may also include the training of the anomaly detector.

The term second machine learning model component shall be, in the context of the present invention, to cover machine learning model comprising one or more layers, such as a multilayer perceptron (MLP) type model having one or more layers. If the second machine learning model component is implemented with one layer only it is a linear combination of the one or more outputs of the one or more anomaly detectors.

The training of the machine learning system 150 of FIG. 2 may be implemented so that it consists of two phases i.e. a training phase and a calibration phase. In the training phase the first machine learning model component 210 may be arranged to receive data 230 as an input. The received data 230 may comprise predetermined data from at least one source system as discussed. The data 230 may also be called as training data which may also provide type 1 uncertainty estimates, e.g. from quantiles. The type 1 uncertainty estimates may refer to aleatoric type uncertainty estimates, as a non-limiting example. These uncertainty estimates are only valid within seen data distribution. Hence, the first machine learning model component 210 may be trained with the data so that it may generate a prediction, and also uncertainty estimate of the prediction in an embodiment of the invention. In some other embodiment of the invention, the uncertainty estimate of the prediction may be generated by another machine learning model component, such as by the second machine learning model component 240 or an external machine learning model component as non-limiting examples.

Correspondingly, the second machine learning model component 240 of the machine learning system 150 may be trained with the same data 230 as the first machine learning model component 210. Alternatively, the data used for the training of the first and the second machine learning model component may differ from each other at least in part even if they may be stored, at least temporally, in a same data storage, such as in a database. For example, the data used for training the second machine learning model component 240 may be so-called uncertainty calibration data whose generation may advantageously be arranged to be out-of-distribution from the data used for training the first machine learning model component.

The so-called uncertainty calibration data may be generated by various methods. For example, uncertainty calibration data may be generated by applying abnormal or randomized control signals to a data generating target system, or a real or simulated source system corresponding to the target system. As another non-limiting example, data may be divided i.e. clustered for use as either uncertainty calibration data or training data, so that the uncertainty calibration data is not at least completely represented in the training data. As another example, out-of-distribution data can be generated using the trained first machine learning model component 310, by using the prediction model to stand in for the process and applying abnormal or randomized control signals. Out-of-distribution data may also be generated by making changes, e.g. adding random noise, to the trained first machine learning model component 310 i.e. the prediction model, parameters, and using the changed first machine learning model components to generate data, which will then be distributed out-of-distribution from the trained first machine learning model component 310, and therefore differently from the data the trained first machine learning model component was trained to predict. Hence, the uncertainty calibration data may be generated either by a simulator or from existing data. For sake of clarity it is worthwhile to mention that this does not mean that all kinds of data examples have to be seen in the calibration data, but rather that some examples provide a means to estimate better the real prediction uncertainty when an anomaly is seen.

Moreover, in an implementation of the present invention in which a separate set of data 230 specific to the second machine learning model component may be employed in training the type 2 uncertainty estimates. As a non-limiting example of the type 2 uncertainty estimates may be epistemic uncertainty estimates. At least one purpose of the training step in the calibration phase may be to provide sensible scaling for the anomaly detector 220 outputs through a generation of a prediction error to the uncertainty model. The prediction error may be determined by subtraction the training data 230 specific to the second machine learning model component from the output of the first machine learning model component 210. In FIG. 2 the subtraction is illustrated as a separate operation, but it may be defined as an internal operation inside the uncertainty model 240. All in all, the scaling, at least, provides better uncertainty estimates for previously unseen data.

The training of the second machine learning model component 240 in the manner as described causes the second machine learning model component 240 to generate a calibrated uncertainty estimate of the prediction.

As mentioned above the machine learning system 150 according to an embodiment of the invention may comprise one or more anomaly detectors 220. The at least one anomaly detector 220 may be trained with the same data 230 as the prediction model 210 as discussed, or the anomaly detector may be evaluated in the manner as described. According to at least one embodiment the anomaly detector 220 may be arranged to generate corrupted data from the original data 230.

Figure 3:
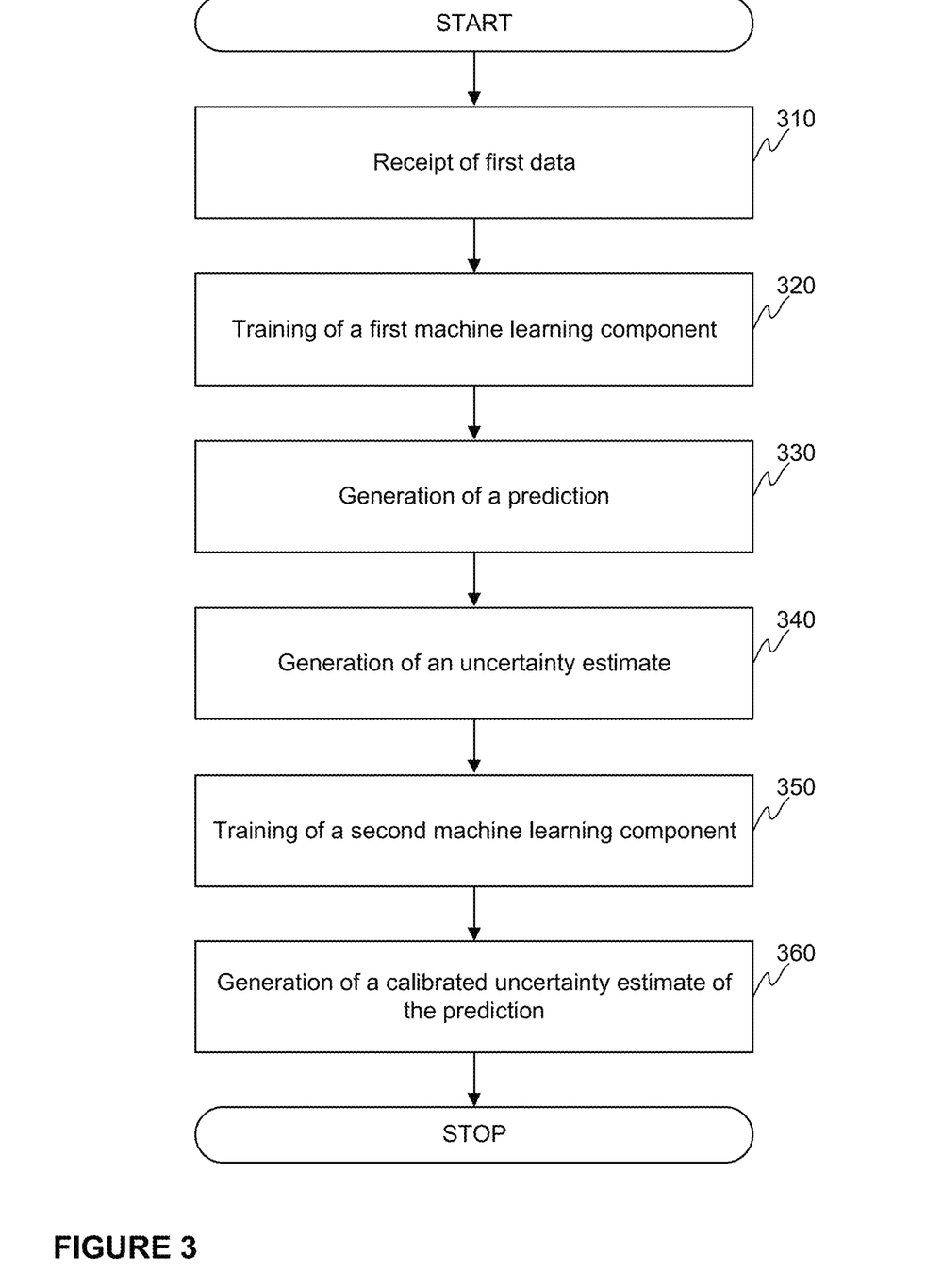
FIG. 3 illustrates schematically a method according to an embodiment of the invention.

More specifically, the one or more anomaly detectors 220 may be trained with the same training data, which may provide a signal whether the input values are in a known or unknown state. Hence, the anomaly detectors 220 may, among other task, to generate one or more indications if the input data values of the training data are present in a known state or not (i.e. corresponding to unknown state). In practice, the anomaly detectors 220 may be arranged to scan both past measurements and also future predictions. They may be arranged to use short windows (and possibly different timescales/resolutions) so that they may generalize the received data better In the following some non-limiting examples of possible anomaly detectors 220 applicable in a context of the present invention are disclosed:

Past prediction performance detector
   Use previous prediction errors as a measure of anomaly
   Baseline, by definition only works for past measurements and past predictions, not for future predictions "Case-based reasoning" i.e. matching data detector
   E.g. Distance to n nearest past measurement data matches
   Not good for high-dimensional data in naive form Noise-contrastive detector
   Training data, corrupted (varying levels) training data->train model to detect which and at which level
   As a basic example, the noise can be independent and identically distributed (IID) Gaussian noise, but signal correlations can also be taken into account when creating the noise Denoising autoencoder detector
   Task is to take corrupted data and predict original clean data
   Then, corrupted signal is compared to the denoised signal and distance of these is the detector output Next, a method according to an embodiment of the invention is described by referring to FIG. 3 illustrating schematically the method as a flow chart. As mentioned, the method according to the embodiment may be implemented with a machine learning system 150 comprising a first machine learning model component and a second machine learning model component. The machine learning components are trained and, after training, used, with data received from a target process or a task. The data received may vary according to the target process or task. The data may be e.g. time series data of the state of the target process, or samples of input-output data samples, e.g. digital images and the corresponding classification of the image. In general, the data received is determined by the target process or task for which the predictions are generated by the machine learning system and the uncertainty of which predictions are to be determined. The method may be initiated by receiving 310 first data. The first machine learning component may be trained 320 with the received first data. The first machine learning component is trained for generating a prediction 330. Next, an uncertainty estimate may be generated 340. The uncertainty estimate may be generated by the first machine learning model component 210, a second machine learning model component 240 or an external machine learning model component. Furthermore, the second machine learning model component 240 may be trained with second data 350. This is performed in order to case the second machine learning model component 240 to generate a calibrated uncertainty estimate of the prediction 360.

As is derivable from above through the training procedure of the machine learning system a prediction of the target process state and an estimate of uncertainty of the prediction may be achieved as an output. The uncertainty may be given e.g. in the form of a probability distribution of the prediction, a quantized approximation of a distribution, or a confidence interval of the prediction.

For sake of clarity it shall be understood that the uncertainty generated with the machine learning system 150 according to an embodiment of the invention is different from usual statistically determined uncertainty in the data, because it includes the uncertainty resulting from the model defining at least part of the system being inaccurate, not just stochasticity of the data.

Furthermore, some aspects of the present invention may relate to a computer program product comprising at least one computer-readable media having computer-executable program code instructions stored therein that cause, when the computer program product is executed on a computer, such as by a processor of the system, the generation of the estimation on the uncertainty of a prediction generated by a machine learning system according to the method as described.

Generally speaking, the system 110 may refer to a distributed computer system, a computer, a circuit or a processor in which the processing of data as described may be performed. Similarly, the operations of the neural network models may be implemented with a single neural network model or with a plurality of distinct models through controlling and configurating the model(s) accordingly.

As a non-limiting example, a target system in which the present invention may be applied to may be a chemical production or another industrial process plant, where the training and input data comprises sensor measurements from different parts of the process (e.g. temperature, pressure, flow rate, voltage, current, camera images) and control signals, for example setpoint values for temperatures, pressures, flow rates etc. The control signals may be setpoint values of other, e.g. lower-level, controllers, such as PID controllers or other hardware or software components. The predictions in this example may then be the same signals as in the training and input data, or a subset of the data, i.e. the prediction is a prediction of the state of the system, and the estimated uncertainty is then the uncertainty, e.g. a confidence interval, of each such signal or some composite function of the signals.

In another non-limiting example, the target system may be an autonomous vehicle or a robotic system, where data includes sensor measurements, such as position, orientation, speed, current, voltage, camera images etc. and control signals, like steering actions, commands to a separate autopilot system, picking or manipulation commands, etc.

In a still further non-limiting example, the target system may be an automated document handling system or another IT system, where the data includes e.g. digital documents, digital images, database records, web pages etc., and control actions, such as e.g. a document classification, category, or information interpreted or extracted from a document. Data may include extracted features of the aforementioned data, such as words, characters, optical character recognition (OCR) results.

In a still further non-limiting example, the target system may be a production line QA (Quality Assurance) system, where the data includes sensor measurements from manufactured material or products, e.g. camera images, where a QA system is used to detect e.g. defects in the products. The method according to the invention may then e.g. be used to determine when the QA system's prediction of product quality has high uncertainty, for the further purpose of e.g. generating a control signal to move a product aside as a fault risk.

In a still further non-limiting example, the target system may be a medical monitoring system, where the data includes data generated from medical sensors such as heartbeat, EEG, ECG, EKG sensors, blood analyzers outputs etc., and actions of control signals e.g. alerts to medical personnel, automatic administration of drugs, further tests, electrical stimulation etc.

For sake of clarity it is worthwhile to mention that the term "machine learning model component" refers, in addition to descriptions provided herein, to methods where algorithms or models may be generated based on samples of input and output data by automatic training of the algorithm or model parameters.

Moreover, the machine learning system 150 may refer to an implementation in which a processing unit is arranged to execute a predetermined operation for causing the machine learning system 150, and the component(s) therein, and, hence, the system 110 to perform as described. The machine learning system may be connected to other systems and data sources via computer networks, and may be arranged to fetch the data from other systems for training the machine learning components, which may be triggered by user of the system, or automatically triggered e.g. by regular intervals. The machine learning system may include trained machine learning components as serialized, file-like objects, such as for example trained neural network weight parameters saved as a file. The machine learning parameters may be stored, generated and modified in the machine learning system, or they may be generated in an external system and transferred to the machine learning system for use.

Moreover, it may be implemented so that the system 110, or any other entity, may be arranged to monitor the value of the generated calibrated uncertainty estimate of the prediction and if it exceeds a limit, the system 110 may be arranged to generate a notification for indicating that the value is not within predetermined limits. This may e.g. cause a generation of an alarm e.g. in order to achieve optimization of the system so that the system again operates within operational limits.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A non-transitory computer-readable medium on which is stored program that, when executed by a computer, performs a method for estimating an uncertainty of a prediction generated by a machine learning system, the method comprising:
   receiving first data;
   training a first machine learning model component of a machine learning system with the received first data, the first machine learning model component is trained to generate a prediction;
   generating an uncertainty estimate of the prediction; and
   training a second machine learning model component of the machine learning system with second data, the second machine learning model component is trained to generate a calibrated uncertainty estimate of the prediction based on the prediction, the uncertainty estimate of the prediction, and an output of at least one anomaly detector.

2. The computer-readable medium of claim 1, wherein the uncertainty estimate of the prediction is generated by one of the first machine learning model component, the second machine learning model component, or an external machine learning model component.

3. The computer-readable medium of claim 1, wherein the anomaly detector is trained with the received second data for detecting deviation in the operational data.

4. The computer-readable medium of claim 1, wherein the first machine learning model component is one of a denoising neural network, a generative adversarial network, a variational autoencoder, a ladder network, or a recurrent neural network.

5. The computer-readable medium of claim 1, wherein the second machine learning model component is one of a denoising neural network, a generative adversarial network, a variational autoencoder, a ladder network, or a recurrent neural network.

6. The computer-readable medium of claim 1, wherein the second data is out-of-distribution data.

7. The computer-readable medium of claim 6, wherein the out-of-distribution data is generated by corrupting the first machine learning model component parameters and generating the out-of-distribution data by evaluating the corrupted first machine learning model component.

8. A system for estimating an uncertainty of a prediction generated by a machine learning system, the system is arranged to:
   receive first data,
   train a first machine learning model component of a machine learning system with the received first data, the first machine learning model component is trained to generate a prediction,
   generate an uncertainty estimate of the prediction,
   train a second machine learning model component of the machine learning system with second data, the second machine learning model component is trained to generate a calibrated uncertainty estimate of the prediction based on the prediction, the uncertainty estimate of the prediction, and an output of at least one anomaly detector.

9. The system of claim 8, wherein the system is arranged to generate the uncertainty estimate of the prediction by one of the first machine learning model component, the second machine learning model component, or an external machine learning model component.

10. The system of claim 8, wherein the system is arranged to train the anomaly detector with the received second data for detecting deviation in the operational data.

11. The system of claim 8, wherein the first machine learning model component is one of a denoising neural network, a generative adversarial network, a variational autoencoder, a ladder network, or a recurrent neural network.

12. The system of claim 8, wherein the second machine learning model component is one of a denoising neural network, a generative adversarial network, a variational autoencoder, a ladder network, or a recurrent neural network.

13. The system of claim 8, wherein the second data is out-of-distribution data.

14. The system of claim 13, wherein the out-of-distribution data is generated by corrupting the first machine learning model component parameters and generating the out-of-distribution data by evaluating the corrupted first machine learning model component.

15. A method for estimating an uncertainty of a prediction generated by a machine learning system, the method comprising:

receiving first data;

training a first machine learning model component of a machine learning system with the received first data, the first machine learning model component is trained to generate a prediction;

generating an uncertainty estimate of the prediction; and training a second machine learning model component of the machine learning system with second data, the second machine learning model component is trained to generate a calibrated uncertainty estimate of the prediction based on the prediction, the uncertainty estimate of the prediction, and an output of at least one anomaly detector.

16. The method of claim 15, wherein the uncertainty estimate of the prediction is generated by one of the first machine learning model component, the second machine learning model component, or an external machine learning model component.

17. The method of claim 15, wherein the anomaly detector is trained with the received second data for detecting deviation in the operational data.

18. The method of claim 15, wherein the first machine learning model component is one of a denoising neural network, a generative adversarial network, a variational autoencoder, a ladder network, or a recurrent neural network.

19. The method of claim 15, wherein the second machine learning model component is one of a denoising neural network, a generative adversarial network, a variational autoencoder, a ladder network, or a recurrent neural network.

20. The method of claim 15, wherein the second data is out-of-distribution data.

21. The method of claim 20, wherein the out-of-distribution data is generated by corrupting the first machine learning model component parameters and generating the out-of-distribution data by evaluating the corrupted first machine learning model component.

* * * * *